United States Patent
Rowstron et al.

(10) Patent No.: US 10,719,239 B2
(45) Date of Patent: Jul. 21, 2020

(54) DISAGGREGATED DATA STORAGE AND RETRIEVAL SYSTEM

(71) Applicant: Microsoft Technology Licensing, LLC, Redmond, WA (US)

(72) Inventors: Antony Ian Taylor Rowstron, Cambridge (GB); Ioan Alexandru Stefanovici, Cambridge (GB); Aaron William Ogus, Woodinville, WA (US); Douglas Wayne Phillips, Woodinville, WA (US); Richard John Black, Cambridge (GB); Austin Nicholas Donnelly, Cambridge (GB); Alexander Lloyd Gaunt, Cambridge (GB); Andreas Georgiou, Cambridge (GB); Ariel Gomez Diaz, Cambridge (GB); Serguei Anatolievitch Legtchenko, Cambridge (GB); Reinhard Sebastian Bernhard Nowozin, Cambridge (GB); Benn Charles Thomsen, London (GB); Hugh David Paul Williams, Cambridge (GB); David Lara Saucedo, London (GB); Patrick Neil Anderson, Cambridge (GB); Andromachi Chatzieleftheriou, Cambridge (GB); John Christopher Dainty, Galway (IE); James Hilton Clegg, Cambridge (GB); Raluca Andreea Diaconu, Cambridge (GB); Rokas Drevinskas, Cambridge (GB); Mengyang Yang, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/981,789

(22) Filed: May 16, 2018

(65) Prior Publication Data
US 2019/0354283 A1    Nov. 21, 2019

(51) Int. Cl.
*G11B 7/0065*    (2006.01)
*G06F 3/06*    (2006.01)
(Continued)

(52) U.S. Cl.
CPC ............ *G06F 3/061* (2013.01); *G06F 3/0634* (2013.01); *G06F 3/0653* (2013.01);
(Continued)

(58) Field of Classification Search
CPC ....... G11B 5/54; G11B 15/68; G11B 15/6885; G11B 15/1883; G11B 2220/2504; G11B 7/0065; G11B 2007/00653
(Continued)

(56) References Cited

U.S. PATENT DOCUMENTS 5,832,523 A    11/1998   Kanai et al.
9,053,738 B1 *    6/2015   Jesionowski .......... G11B 15/68
(Continued)

FOREIGN PATENT DOCUMENTS

EP    1052633 A1    11/2000

OTHER PUBLICATIONS

"Microsoft Project Silica", Retrieved on Apr. 17, 2018. 4 pages. Available at: https://www.microsoft.com/en-us/research/project/project-silica/.
(Continued)

*Primary Examiner* — Nabil Z Hindi
(74) *Attorney, Agent, or Firm* — Alleman Hall Creasman & Tuttle LLP (57) ABSTRACT

A data-storage system comprises a head receiver configured to variably receive up to a number M of write heads. The
(Continued)

data-storage system also includes an installed number N of write heads arranged in the head receiver, a substrate receiver configured to receive one or more data-storage substrates, and a positioner machine configured to adjust a relative placement of each of the M write heads with respect to at least one of the one or more data-storage substrates.

14 Claims, 6 Drawing Sheets

(51) Int. Cl.
    *G06N 20/00*     (2019.01)
    *G11B 7/085*     (2006.01)

(52) U.S. Cl.
    CPC ........... *G06F 3/0677* (2013.01); *G06N 20/00* (2019.01); *G11B 7/0857* (2013.01)

(58) Field of Classification Search
    USPC ....... 360/75, 78.02, 91, 92.1, 93; 369/44.37, 369/103
    See application file for complete search history.

(56) References Cited

U.S. PATENT DOCUMENTS

2010/0067343 A1     3/2010   Kaneko
2013/0326136 A1   12/2013   Carter et al.
2017/0255533 A1     9/2017   Coglitore et al.

OTHER PUBLICATIONS

Overton, Gail, "Microsoft's Project Silica exploring voxel-based optical data storage", Apr. 13, 2018. 3 pages. Available at: https://www.laserfocusworld.com/articles/2018/04/microsoft-s-project-silica-exploring-voxel-based-optical-data-storage.html.

Mellor, Chris, "Microsoft's Pelican brief, MAID in Azure* and femtosecond laser glass storage", Apr. 11, 2018. 8 pages. Available at: https://www.theregister.co.uk/2018/04/11/pelican_maids_in_the_azure_and_femtosecond_laser_glass_storage/.

Russon, Mary-Ann, "Scientists smash data storage records with 360TB glass device that saves files for billions of years" Feb. 16, 2016. 3 pages. Available at: https://www.ibtimes.co.uk/scientists-smash-data-storage-records-360tb-glass-device-that-saves-files-billions-years-1544226.

"International Search Report and Written Opinion Issued in PCT Application No. PCT/US2019/029629", dated Sep. 25, 2019, 18 Pages.

Zhang, et al., "5D Data Storage by Ultrafast Laser Nanostructuring in Glass", In Proceedings of Conference on Lasers and Electro-Optics, May 9, 2013, 2 Pages.

Zhang, et al., "Eternal 5D Data Storage by Ultrafast Laser Writing in Glass", In Proceedings of International Society for Optics and Photonics, Mar. 4, 2016, 17 Pages.

Zijlstra, et al., "Five-dimensional optical recording mediated by surface plasmons in gold nanorods", In Journal of Nature, vol. 459, May 21, 2009, pp. 410-413.

"Notice of Allowance Issued in U.S. Appl. No. 16/680,865", dated May 4, 2020, 9 Pages.

* cited by examiner

DISAGGREGATED DATA STORAGE AND RETRIEVAL SYSTEM

BACKGROUND

Over the past decade, much of the world's data has moved into the cloud. Projections indicate that by the beginning of the next decade, zettabytes of data will be stored in cloud-based storage. To meet the increasing demand, cloud providers rely on a variety of data-storage technologies. These include non-volatile memory (NVM), flash, hard disk drives (HDDs), magnetic tape, and optical discs. These storage technologies differ from each other in terms of cost, latency, throughput, storage density, failure rate, and media lifetime.

As one example, flash storage offers acceptable durability, high throughput, and low latency. A flash-provisioned service could be used, therefore, to handle current workloads in the cloud according to a single-storage type Service Level Agreement (SLA). However, the high cost of flash storage is prohibitive for very large volumes of data. On the cloud, therefore, this technology is used primarily to store so-called 'hot' data—i.e., recent or transient data. Cloud providers handle 'cooler' data using a segregated tier system, each tier having a different SLA, with pricing and performance characteristics dictated by the associated storage technology.

SUMMARY

One aspect of this disclosure is directed to a data-storage system comprising a head receiver configured to variably receive up to a number M of write heads. The data-storage system also includes an installed number N of write heads arranged in the head receiver, a substrate receiver configured to receive one or more data-storage substrates, and a positioner machine configured to adjust a relative placement of each of the M write heads with respect to at least one of the one or more data-storage substrates.

Another aspect of this disclosure is directed to a data-retrieval system comprising a head receiver configured to variably receive up to a number P of read heads. The data-retrieval system also includes an installed number Q of read heads arranged in the head receiver, a substrate receiver configured to receive one or more data-storage substrates, and a positioner machine configured to adjust a relative placement of each of the P read heads with respect to at least one of the one or more data-storage substrates.

Another aspect of this disclosure is directed to a method for reconfiguring a system to store and retrieve data in a data server. The method comprises monitoring current performance data for the system, the current performance data comprising data regarding one or more of storage performance and retrieval performance; monitoring current workload data for the system, the current workload data comprising data regarding one or more of storage demand and retrieval demand; forming a feature vector for a machine-learning model, the feature vector comprising the current performance data, the current workload data, and data related to a target performance of the system; providing the feature vector to the machine-learning model; obtaining from the machine-learning model an output of one or more actions to take to adjust a current state of the system based upon the target performance of the system; and implementing the one or more actions to adjust the current state of the system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

This disclosure is presented by way of example, and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

This disclosure addresses the problem of large-scale data storage and retrieval on a cloud service. The disclosed examples disaggregate the read and write paths from the physical storage media and uses different technologies to read and write the data. In this manner, the disclosed examples enable intelligent scaling of read, write, and storage resources in response to variable and evolving demand scenarios. In some examples, machine learning may be used to discover the optimal arrangement of hardware and software components to service an expected range of storage and retrieval demand. 'System adaptation' is a term used herein to refer to a change or re-configuration of the components of a data server to enable 'elasticity'—i.e., selective deployment of those resources needed to support the demand on the data server at a given time. The related objective of 'right provisioning' refers to managing the cost of providing the required hardware and other componentry in order to secure the desired level of performance at the point of deployment. Right provisioning may also be directed to other objectives of a cloud service provider or user. Such objectives may include post-deployment refitting with updated hardware (e.g., improved read and write heads), and changing the configuration of hardware already deployed in response to an unexpected change in storage or retrieval demand.

Figure 1:
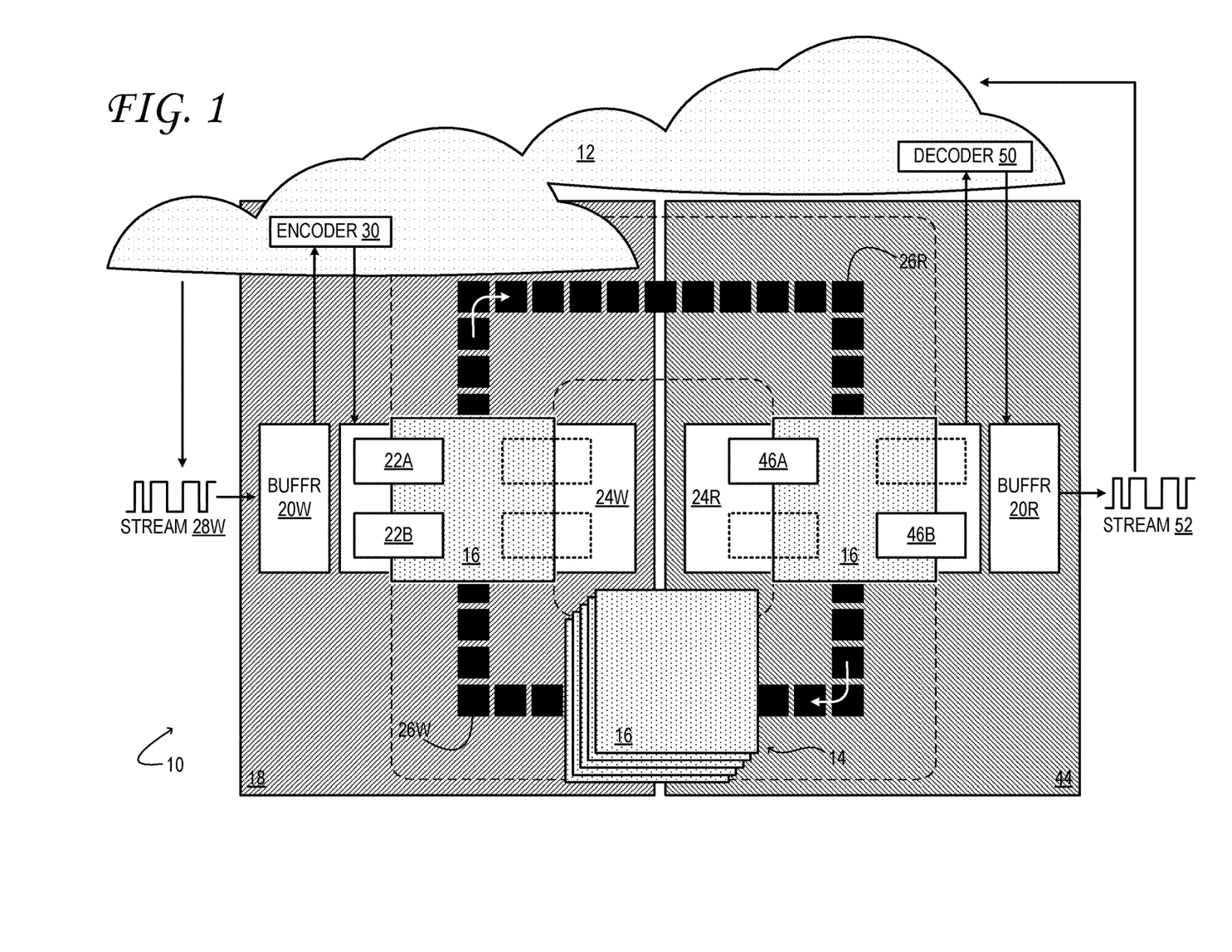
FIG. 1 shows aspects of an example data storage and retrieval (DSR) system.

FIG. 1 shows aspects of an example data storage and retrieval (DSR) system 10 of a computer network 12. The computer network may be referred to as 'the cloud'; it may include a local-area network (LAN) or intranet, a wide-area network such as the Internet, or any portion or combination thereof. DSR system 10 includes a substrate receiver 14 configured to receive a plurality of data-storage substrates 16. The substrate receiver may take the form of a rack, track, robotic mechanism, and/or carousel, for example.

Each data-storage substrate 16 may be configured for one of several different forms of optical data storage. In the example of FIG. 1, each data-storage substrate is a rectangular silica-glass slab. In other examples, the data-storage substrate may be rotatable or differently shaped—as a disc, prism, or cylinder, for instance. In some examples, high-power, short-pulse laser irradiance is used to write and store data within a data-storage substrate. The irradiance induces a long-lived lattice perturbation at its focus, which derives from a non-linear optical process in the data-storage medium. In some cases, the lattice perturbation has the optical properties of a nanograting embedded within the medium, at the point where the irradiance is imaged. Data written to a data-storage substrate in this manner can be read back using an optical beam to interrogate the various grating-like perturbations formed within it.

Accordingly, arbitrary data (i.e. data that may differ from substrate to substrate) can be written into a data-storage substrate 16 using high-power, coherent irradiance. The term 'voxel' is used herein to refer to any discrete locus of a data-storage substrate where an individual data value (i.e., symbol) may be stored. The data stored in a voxel may take various forms. In principle, the substrate lattice can be manipulated to affect changes in any of the coefficients of the Mueller matrix used to characterize the physical changes induced by the irradiance. In examples using silica-glass substrates, the lattice perturbation from focused, polarized irradiance takes the form of a non-native birefringence localized at the focus. Accordingly, each voxel of the data-storage substrate may be modeled as a very small waveplate of a retardance $\delta d$ and slow-axis orientation $\phi$. These model parameters may be manipulated independently to write a desired symbol to a given voxel. Here, the polarization angle of the beam determines the slow-axis orientation $\phi$, while various other factors (pulse amplitude, duration, energy, number, and/or spacing between pulses) determine the strength of the waveplate grating, and therefore the retardance $\delta d$.

By dividing the continuous space of achievable slow-axis orientations and retardances into discrete intervals, multi-bit data values may be encoded into each voxel—viz., by independently coercing the birefringence of that voxel to be within one of the discrete intervals. In this manner, each voxel may encode one of $K \geq 1$ different retardance states at each of $L \geq 1$ different polarization angles. In some examples, many parallel layers of voxel structures may be written to the same data-storage substrate by focusing the laser irradiance to specified depths below the irradiated surface of data-storage substrate 16. This mode of data storage is referred to as '5D optical storage'.

In other examples related to 5D optical data storage, data-storage substrate 16 may comprise a film of silica glass (e.g., 30 to 300 microns thick), coupled to a mechanically stable supporting layer. In still other examples, a polymer data-storage substrate may be used; this type of data-storage substrate may be applied to holographic data storage, where the data is confined to a single, thin layer of the data-storage substrate. In still other examples, the data written to a data-storage substrate may be encoded not as a localized birefringence, but as another optical characteristic—e.g., a localized scattering center formed by focused, high-power laser irradiance of the data-storage substrate.

Continuing in FIG. 1, DSR system 10 includes a data-storage (DS) system 18. The DS system comprises a write buffer 20W, a plurality of optical write heads 22, a head receiver 24W, and a positioner machine 26W.

Write buffer 20W is configured to buffer the input data stream 28W to be written to one or more of the data-storage substrates 16. Encoder 30 is configured to encode the data from the write buffer and to provide encoded write data to the write controller (not shown in FIG. 1). The write controller then provides appropriate control signals to the plurality of optical write heads 22, so that the data is written to the associated data-storage substrates 16 according to the desired encoding. In the illustrated example, encoder 30 is service hosted on computer network 12. In other examples, the encoder may be a component of DS system 18.

Head receiver 24W is a mechanical structure configured to receive a maximum number M of optical write heads 22. The head receiver may include a plurality of sockets, slots, tracks, or fixtures configured to fittably receive M optical write heads. The head receiver may also include any suitable electronic and/or fiber optic coupling configured to provide power, control signal, and, in some examples, laser irradiance to each of the M optical write heads. In the instantiation of FIG. 1, an installed number N of optical write heads 22 is arranged in head receiver 24W. A solid rectangular box is used in FIG. 1 to denote a currently installed optical write head, whereas a dashed box is used to denote an empty socket where an optical write head may be installed. In some use scenarios, the installed number N of optical write heads may be smaller than the maximum number M of optical write heads. In other scenarios, the maximum number M may be installed. In either scenario, either a subset or a full set of write heads may be used for data writing, depending upon current needs.

Positioner machine 26W is configured to adjust a relative placement of each of the M optical write heads 22 with respect to at least one of the one or more data-storage substrates 16. In the illustrated example, the positioner machine is configured to move the data-storage substrates into registry with the optical write heads arranged in head receiver 24W. In the illustrated example, the positioner machine includes a conveyor mechanism (shown as filled boxes) configured to draw each of the data-storage substrates out of the substrate receiver when that substrate is required for writing. The illustrated positioner machine also includes a rotor (filled circle) configured to rotate the data-storage substrate in order to expose on or more tracks or sectors of the substrate to the appropriate optical write head. In other examples, the positioner machine may include a servomechanical translational stage—e.g., an X, Y stage for positioning the substrate in two directions. In other examples, the positioner machine may be configured to move the optical write heads into registry with the data-storage substrates arranged in substrate receiver 14. In still other examples, the positioner machine may be configured to move both the optical write heads and the data-storage substrates, to ensure proper registry among these components during the write process.

Figure 2:
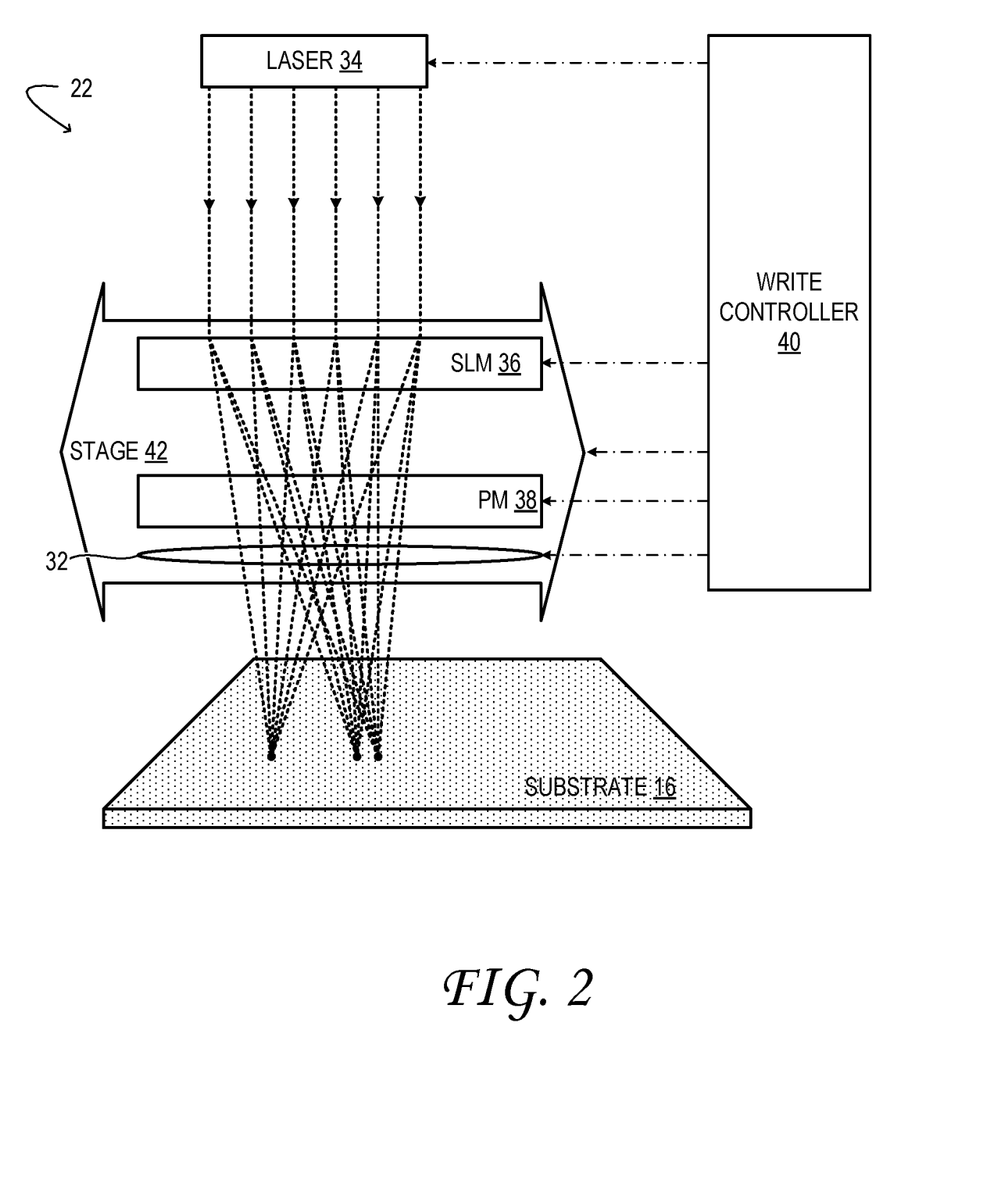
FIG. 2 shows aspects of an example optical write head of a DSR system.

FIG. 2 shows aspects of an example optical write head 22 of DS system 18. Each optical write head 22 includes a focusing optic 32 configured to focus laser irradiance on a data-storage substrate associated with that optical write head. In examples in which data is to be written to a plurality of depth layers of a data-storage substrate 16, the focusing optic may include an adjustable objective lens system configured to focus the laser irradiance to any selected depth layer of the data-storage substrate.

To provide the laser irradiance for writing data, DS system 18 includes at least one high-power laser 34 configured to irradiate one or more of a maximum number M of optical write heads. Laser 34 may be configured to emit a pulsed wavefront having uniform phase and polarization. In configurations directed to 5D optical storage on glass substrates, the laser may be a femtosecond pulsed laser emitting in a narrow wavelength band of fixed (e.g., plane) polarization. Irradiance from the laser may comprise, accordingly, a repeating pulsetrain of subpicosecond photon pulses—e.g., tens to hundreds of femtoseconds in duration. In some implementations, laser 34 may be one or more of Q-switched and mode-locked, to provide very brief pulses of very high energy. In some cases, shorter wavelengths of a light may be formed by using optical harmonic generators utilizing non-linear processes. Other forms of laser irradiance are also envisaged. In some examples, a separate laser 34 is provided for each optical write head 22. In other examples, a smaller number of lasers (e.g., one laser) may be used; the high-power laser output from the smaller number of lasers may be demultiplexed to each of M optical write heads.

In order to write data at an acceptably high throughput, each optical write head 22 of DS system 18 is configured to write numerous voxels in parallel. Although it is possible to write each voxel serially, the required overhead of high-speed, high-precision mechanical movement may make such an approach impractical. To write data in parallel, the output of high-power laser 34 may be split into a plurality of independently modulated, voxel-sized child beams, so that a corresponding plurality of voxels may be written simultaneously. Each child beam, however, must be rotated to the particular polarization state appropriate for the symbol it writes. To achieve these functions, optical write head 22 may include an imaging optic in the form of an electronically addressable spatial light modulator (SLM) 36 and an electronically controllable polarization modulator (PM) 38.

SLM 36 of FIG. 2 is configured as a dynamic digital hologram, or grating. The SLM includes an array of pixel elements that receive the wavefront from laser 34. In some non-limiting examples, the SLM may comprise a liquid-crystal SLM, in which polarizable liquid crystal (LC) within each pixel element imparts a variable phase delay to the irradiance passing through that element. Because each pixel element is independently addressable, the magnitude of the variable phase delay may be controlled down to the pixel level.

In other examples, the SLM may comprise a digital micromirror device (DMD), digital light processor (DLP), and/or deformable mirror. Irrespective of the detailed configuration, however, SLM 36 may be configured to enable spatial control of the phase and/or amplitude of the laser wavefront. Such control may be enacted in a pixel-wise or non-pixel-wise manner.

Continuing now in FIG. 2, the holographic projection from SLM 36 passes through PM 38. The PM is a non-imaging active optic configured to rotate, by a controllably variable angle, the polarization state of the holographic projection. In sum, the SLM is used to divide the laser wavefront into the required number of child beams, while PM 38 sets the rotation of the far-field polarization based on the data to be written. This enables an arbitrary symbol $S_i$ to be written to each voxel i of the data-storage substrate, encoded by the slow-axis angle and retardance of that voxel. The symbol may be expressed as a digital value or bit sequence—e.g., 00, 01, 10, 11. An appropriate range of symbols can be realized, for example using two different polarization angles and two possible retardance values for each angle. Other ways include the use of four polarization angles and a single retardance value. Naturally, a larger menu of polarization angles and/or retardance values would correspond to a longer bit sequence.

To data-storage substrate 16, the holographic projection 'appears' as a parallel 2D array of write beams, each having controlled polarization and intensity, and each being mapped to a corresponding voxel of data-storage substrate 16. It will be noted that the mapping of SLM pixels to write beams (i.e., voxels) is not necessarily a 1:1 mapping, but may be 2:1, 4:1, or 10:1, among other suitable mappings. In some examples, the number of write beams achievable practically is about one-fourth the number of pixels on the SLM. For example, with about 10 million SLM pixels, one-million or more child beams may be formed. Moreover, the array of write beams may be reconfigured at the full refresh rate of the SLM.

In optical write head 22, SLM 36 and PM 38 are each coupled operatively to write controller 40. To the SLM, the write controller provides electronic signal that digitally defines the holographic projection; to the PM, the write controller provides electronic signal that defines the variable rotation applied to the polarization state of the holographic projection. These signals may be derived from data provided by encoder 30 of FIG. 1.

In some implementations, the array of pixel positions of SLM 36 may be grouped into a plurality of non-overlapping or marginally overlapping holographic zones, which are exposed sequentially to the wavefront of laser 34. Each holographic zone may be a two-dimensional area of any desired shape—e.g., rectangular, wedge-shaped, ring-shaped, etc. Accordingly, SLM 36 of optical write head 22 may be coupled mechanically to a scanning stage 42, which is configured to change the relative positioning of the SLM versus the laser. In this manner, each of the holographic zones of the SLM may be irradiated in sequence. The scanning stage may be translational and/or rotational, and may be advanced a plurality of times (4, 9, 16 times, etc.) for each time that the SLM is addressed. This approach effectively multiplies the temporal bandwidth of the SLM beyond its maximum refresh rate. In other examples, however, laser 34, SLM 36, and PM 38 may be fixed relative to each other.

In some examples, a suitably configured SLM 36 may be used to divide the laser irradiance into numerous voxel-sized child beams and to simultaneously control the polarization of each of the child beams, so that PM 38 may be omitted. In particular, the SLM may be configured to modulate the different portions of the wavefront to different near-field polarizations and to image the light to an array of data-storage substrate voxels at different far-field polarizations. To this end, the controller logic is configured to receive data and to control modulation of the phase and polarization such that the light diffracted from the imaging optic writes the data to data-storage substrate 16. Such data may include inequivalent first and second data values written simultaneously by the light diffracted from the imaging optic. In other words, the first data value may be written to a first voxel by light of a first far-field polarization while the second data value is written to a second voxel by light of a second, inequivalent far-field polarization.

In some implementations, each of the installed number N of optical write heads 22 may be configured to write arbitrary digital data encoded as a localized birefringence in the associated data-storage substrate 16. In other examples, arbitrary digital data may be encoded as a scattering center or other optical phenomenon, as noted above. In some implementations, the data-writing bandwidth of at least one of the installed optical write heads may differ from at least one other of the other optical write heads. Thus, by varying the number of optical write heads engaged or the data-writing bandwidth of any of the engaged optical write heads, the data-storage bandwidth of DS system 18 may be matched to the rate at which data is available to be ingested by the system.

Returning to FIG. 1, DSR system 10 also includes a data-retrieval (DR) system 44. The DR system comprises a plurality of optical read heads 46, a head receiver 24R configured to receive a maximum number P of optical read heads, and positioner machine 26R configured to adjust a relative placement of each of the P optical read heads with respect to at least one of the one or more data-storage substrates 16. In some examples, DS system 18 and DR system 44 may share the same head receiver and/or positioner machine. In other examples, each of DS system 18 and DR system 44 may include its own, independent head receiver and/or positioner machine. When included, independent head receivers 24W and 24R and/or positioner machines 26W and 26R may differ to some degree.

As in the case of DS system 18, positioner machine 26R of DR system 44 may be configured to move the optical read heads (up to the maximum installable number of read heads), to move the data-storage substrates, or to move both relative to one another. In some scenarios, the installed number Q of optical read heads may be smaller than the maximum number P of optical read heads. In other scenarios, the maximum number P may be currently installed in the system.

Figure 3:
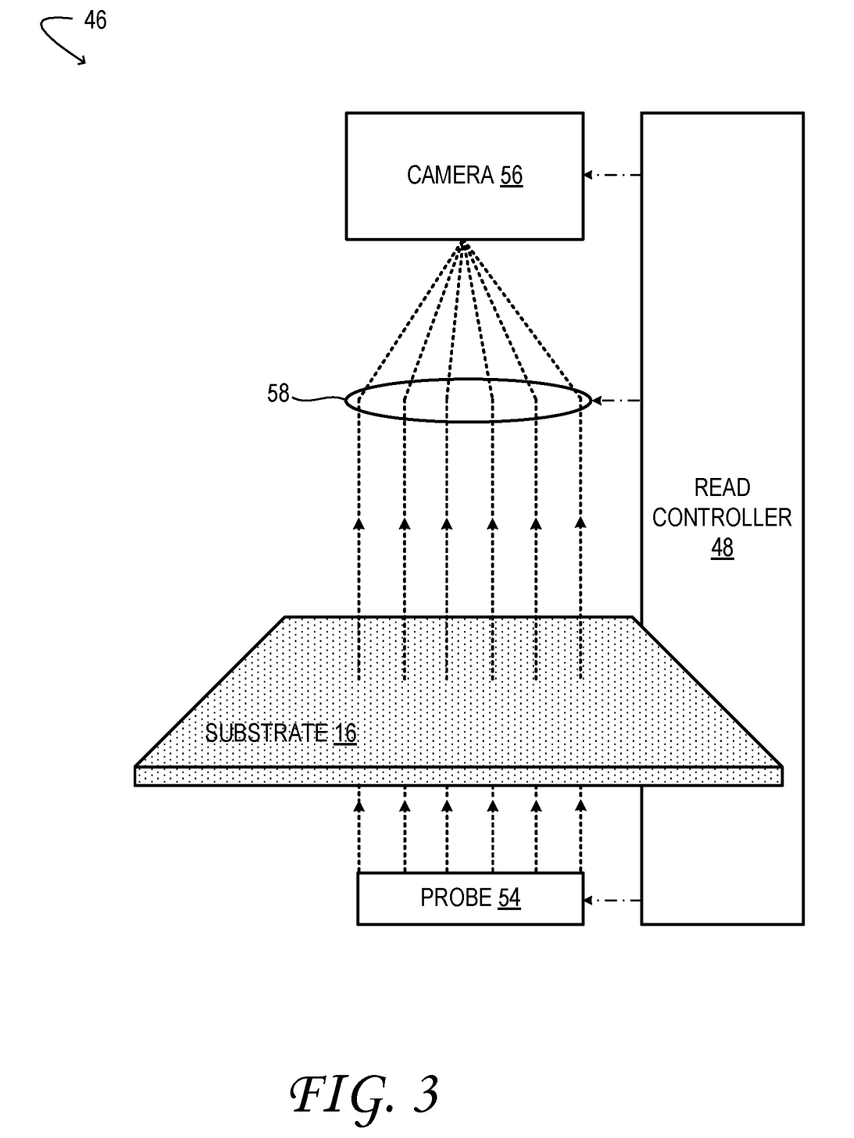
FIG. 3 shows aspects of an example optical read head of a DSR system.

FIG. 3 shows aspects of an example optical read head 46 of DR system 44. The optical read head is configured to read, according to parameters and other control signals supplied by read controller 48, the data that has been stored on an associated data-storage substrate 16. The data read from the data-storage substrate is then passed to decoder 50. In the example illustrated in FIG. 1, the decoder is service hosted on computer network 12. In other examples, the decoder may be a component of DS system 18. In both variants, the decoder is configured to decode and output the data read from the one or more data-storage substrates to read buffer 20, from which an output stream 28R is made available.

Continuing in FIG. 3, each optical read head 46 includes a polarized optical probe 54 and an analyzer camera 56 configured to image the data-storage substrate 16 associated with that optical read head. The polarized optical probe may include a low-power diode laser or other light source. Read controller 48 is coupled operatively to the polarized optical probe and configured to control the angle of the polarization plane of emission of the polarized optical probe.

Analyzer camera 56 may include a high-resolution/high frame-rate CMOS or other suitable photodetector array. The analyzer camera is configured to image light from polarized optical probe 54, after such light has interacted with the voxels of data-storage substrate 16. Although FIG. 3 shows transmission of light rays through the storage medium and on to the camera, the light rays may, in alternative configurations, reach the camera by reflection from the storage medium.

Each image frame acquired by analyzer camera 56 may include a plurality of component images captured simultaneously or in rapid succession. The analyzer camera may resolve, in corresponding pixel arrays of the component images, localized intensity in different polarization planes. To this end, the analyzer camera may include switchable or tunable polarization control in the form of a liquid-crystal retarder or Pockels cell, for example. In one particular example, four images of each target portion of data-storage substrate 16 are acquired in sequence by the analyzer camera as the polarized optical probe 54 is rotated through four different polarization angles. This process is akin to measuring basis vectors of a multi-dimensional vector, where here the 'vector' captures the birefringent properties of the voxels of the imaged target portion. In some examples, a background image is also acquired, which captures the distribution of polarization noise in the component images.

In examples in which data is to be read from a plurality of layers of data-storage substrate 16, optical read head 46 may include an adjustable collection lens system 58. The adjustable collection lens system may collect light rays diffracted from a selected depth layer of the optical storage medium, and reject other light rays. In other implementations, lensless imaging based on interferometry may be employed.

Decoder 50 of FIG. 1 is configured to receive the component images from analyzer camera 56 and to enact the image processing necessary to retrieve the data stored in data-storage substrate 16. Such data may be decoded according to a machine-learning method and/or a canonical method in which an observable physical property is connected through one or more intermediates to the data read from the data-storage substrate.

In the instantiation of FIG. 1, an installed number Q. of optical read heads 46 is arranged in head receiver 24R. A solid rectangular box is used in FIG. 1 to denote a currently installed optical read head, whereas a dashed box is used to denote an empty socket where an optical read head may be installed. In some examples, an empty socket of a given head receiver (24R or 24W) may accommodate either an optical read head or an optical write head.

In some implementations, the data-reading bandwidth of at least one of the installed optical read heads may differ from at least one other of the optical read heads. In particular, optical read heads with different performance characteristics can be used in DR system 44 at the same time. Higher performance is achieved by imaging a larger physical area of data-storage substrate 16 when reading. This can be achieved by using optical read heads having a larger imaging sensor and optical components, or by deploying multiple optical read heads in parallel. These measures may increase cost—viz., if more expensive optical components, or imaging sensors are used—but may be useful in situations such as disaster recovery, when significant data-reading throughput is transiently needed to retrieve much-needed backup data, or if a customer is willing to pay for higher data-reading throughput. Having a mixture of optical read heads with different performance characteristics offers flexibility when choosing how to allocate resources, and to scale system performance.

In some examples, overall read capacity in DR system 44 should support the current read demand, which will change as function of the total amount of data stored in the system, and as a function of the age of the data. Typically, the demand will decrease with increasing age. Read demand for specific data may also increase, however, as a result of a spike in the customer workload—disaster recovery being one example. Deployment of disaggregated optical write and read heads also makes it easier to maximize the value of these heads by keeping them utilized as much as possible. This feature is particularly useful for optical write heads, which may be more than an order of magnitude more expensive than the optical read heads.

In some examples, at least some of the data-reading capability of optical read head 46 may be incorporated in optical write head 22, to enable the data to be verified as it is written. In other examples, read-after-write verification may be achieved simply by associating an optical read head to the same data-storage substrate being written to, in addition to the optical write head.

Figure 4A:
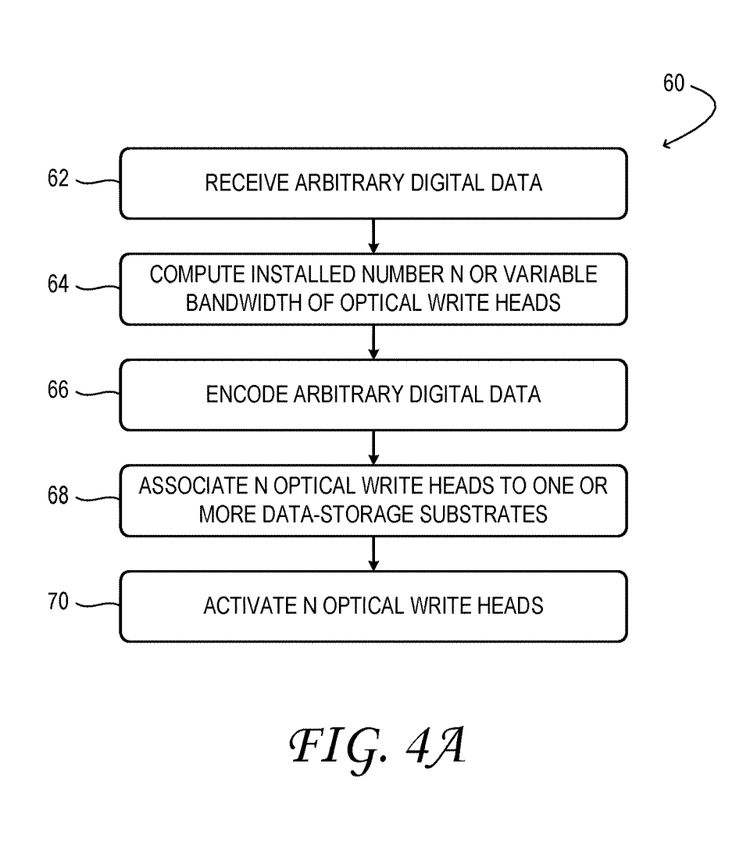
FIG. 4A shows aspects of a method for provisioning resources to store data in a DSR system.

FIG. 4A illustrates an example method 60 for dynamic reconfiguration of a DSR system, such as DSR system 10 of FIG. 1.

At 62 of method 60, the DS system of the data server receives arbitrary digital data to be stored in the data server. At 64 the DS system computes one or more of the desired installed number N and desired variable write-head bandwidth based on a volume of the data to be written in the data server. At 66 an encoder of the DS system encodes the arbitrary digital data for optical storage via the installed number N of optical write heads. At 68 a positioner machine of the data server associates the N optical write heads to one or more data-storage substrates. At 70 the N optical write heads are activated to write the encoded data to the one or more data-storage substrates. As noted above, activating the N optical write heads results may result in substantially permanent storage of the encoded data into the one or more data-storage substrates. Also as noted above, activating the N optical write heads may result in storage of the encoded data into an array of localized voxel positions in the one or more data-storage substrates. In implementations in which the storage is substantially permanent, each of the array of localized voxel positions of a given data-storage substrate may be written only once.

Figure 4B:
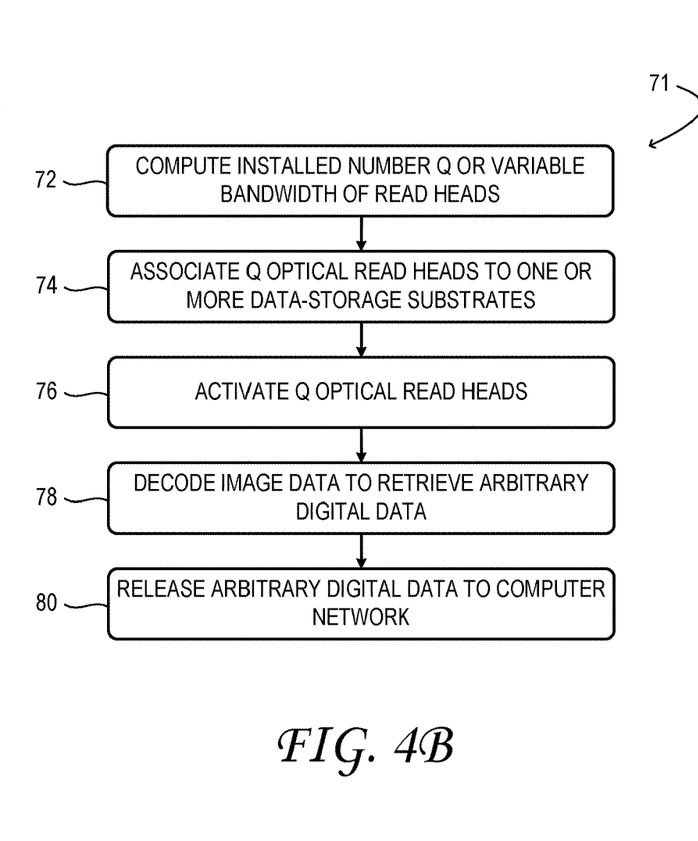
FIG. 4B shows aspects of a method for provisioning resources to retrieve data in a DSR system.

FIG. 4B illustrates an example method 71 for dynamic reconfiguration of a DSR system, such as DSR system 10 of FIG. 1. In some examples, methods 60 and 71 may be enacted together; in other examples, the methods may be enacted separately.

At 72 the DR system computes one or more of a desired installed number Q and desired variable read-head bandwidth based on a volume of the data to be read in the data server. At 74 a positioner machine of the data server associates the variable installed number Q of optical read heads to the one or more data-storage substrates. At 76 the Q optical read heads are activated to read image data from the one or more data-storage substrates. At 78 a decoder of the DR system decodes the image data to retrieve the arbitrary digital data that was stored on the data-storage substrates. At 80 the DR system releases the arbitrary digital data to a computer network.

In some implementations, encoding at 66 and/or the decoding at 78 may be enacted in an elastically provisioned computer system, or virtual machine (VM), on computer network 12 of FIG. 1. In other words, the computing resource necessary to decode the images collected by the optical read head may be physically separate (i.e., disaggregated) from the hardware used to image the data-storage substrates. This is in contrast to prior storage technologies, which have a fixed amount of compute power associated with each optical read head, such compute power being usable only to decode the signal read from the data-storage medium. By contrast, DS system 18 may be configured to stream captured data over the network to, for example, one or more VMs that may be engaged or disengaged responsive to the changing need for image-data decoding. In this manner, disaggregating the decoding compute from the read hardware enables fine-grained scaling of the compute resources provisioned for decoding data, to match the current amount of read activity in the system. Disaggregation also enables batching when decoding data collected from data-storage substrates across the system, which maximizes the utilization of the compute resources provisioned for the decoding operation.

In some implementations of the methods above, the computing of the installed number of optical write heads N and/or the installed number of optical read heads Q may be enacted using a trained machine-learning model executing at runtime. Machine learning may be used both to enable and to drive system adaptation. In a typical scenario, various signals may be monitored, including current and historical characteristics of the workload, and current and historical DSR system configurations and resulting performance characteristics. Machine-learning techniques such as model-based and model-free reinforcement learning, etc., may consume these signals to learn about workload versus system behavior, as well as to derive change/re-configuration decisions and information pertaining to system adaptation. The derived changes are then implemented in the system, to effect the desired behavior.

One particular example of system adaptation is guaranteeing that the right amount of aggregate read capacity is available to service the current workload demand in the system (i.e., the demand for a particular subset of the data stored in the system). Average read demand for data decreases as the total amount of data stored in the system increases, while occasional events like a client initiating disaster recovery for lost data can increase demand for the subset of the data in the system belonging to that client. Such demand dynamics can be accommodated by deploying additional optical read heads into DR system 44, and/or by changing the hardware or software configuration of the DR system (e.g., by reassigning which heads have access to which data-storage substrates. The policy for when this should happen may comprise hard-coded heuristics (e.g., if the total pending read requests for a rack of substrates should exceed a specified threshold), or it could be derived from a machine-learning system trained on real or simulated system configurations and performance characteristics.

One example machine-learning policy takes the form of a neural network that receives the system and workload state observations as input, and outputs a probability distribution over possible next actions to take. Such a network may be trained by reinforcement learning, where a reward metric is used to score the actions of the network and update the weights of the network to maximize the reward. The reward metric may be designed to measure how well the current policy achieves right-provisioning and elasticity by avoiding redundant hardware, while meeting user demand.

In sum, the factor that separates a better machine-learned policy from a more primitive hard-coded policy, in this context, is how quickly and how well the system is able to respond to change—viz., meeting the new read or write demand in the system, while maximizing the utilization of the deployed resources, including not keeping valuable write or optical read heads idle when there is unmet demand in the system.

More generally, the high-level goal of system adaptation using machine learning is to drive changes in the system configuration, both in hardware and in software. In addition to adjusting the number and or bandwidth of the installed write and read heads, many other aspects of the configuration may evolve under the direction of an appropriate machine-learning method (e.g., model-based reinforcement learning). Additional examples include: using higher-versus lower-bandwidth heads to service a given set of write or read requests; associating heads to substrates; reordering and/or batching certain write or read requests based on appropriate criteria; choosing between different scheduling policies; and changing the number of images (and perhaps even the polarization states) captured of the same substrate and FOV, as an input to the data decoder.

The set of actions output by the machine-learning method may depend on the detailed way in which the world and/or problem is modeled, on tractability (given the dimensionality of the problem), and on the types of system behaviors used to drive the machine-learning model.

Figure 5:
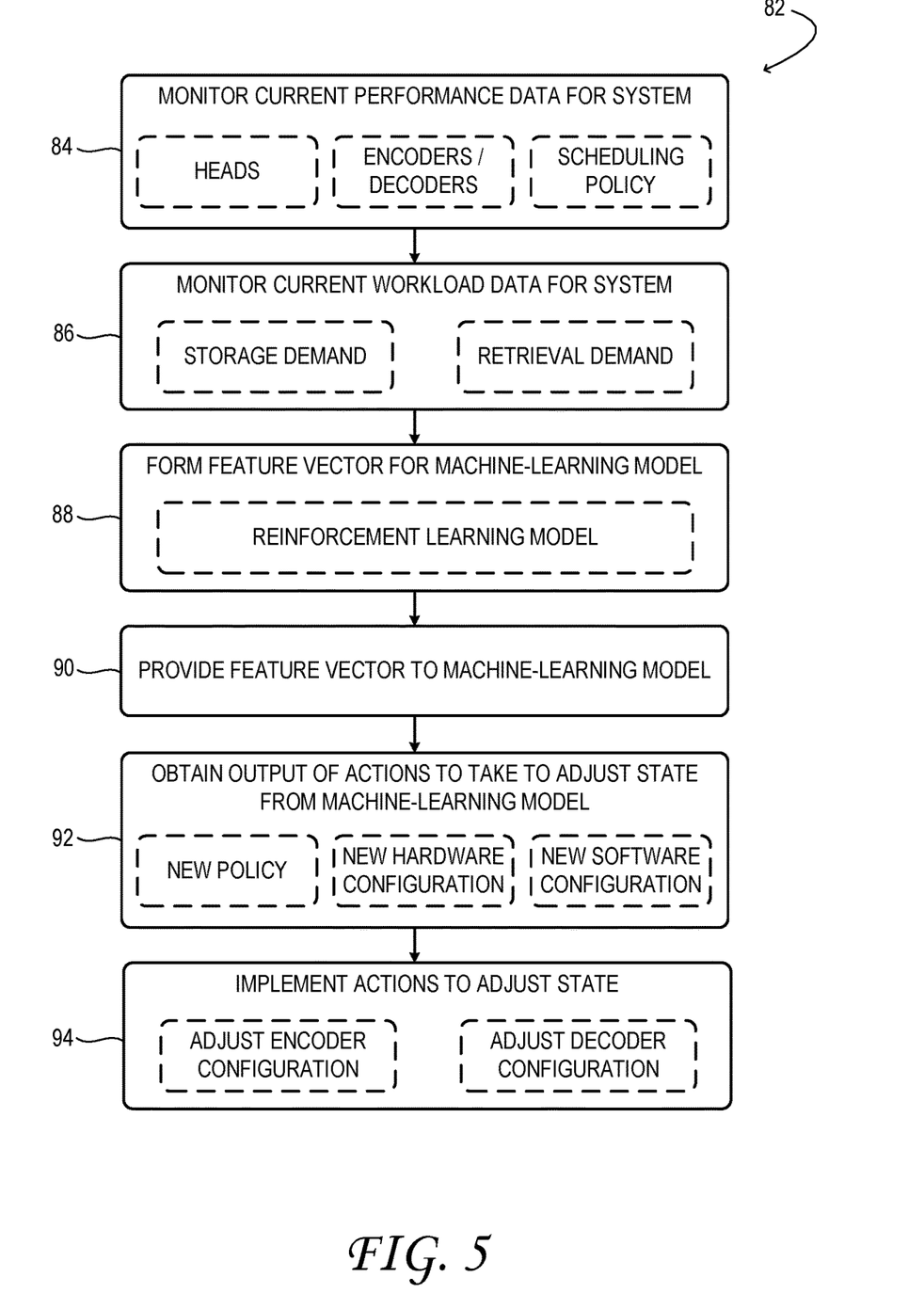
FIG. 5 shows a flow diagram depicting an example method of adjusting a configuration of a DSR system.

FIG. 5 shows an example method 82 for reconfiguring a system to store and retrieve data in a data server using a machine-learning model. The method of FIG. 5 may be implemented on the example data storage and retrieval systems described above. Method 82 comprises, at 84, monitoring current performance data for the system, the current performance data comprising data regarding one or more of data-storage performance and data-retrieval performance. Any suitable performance data may be monitored, including hardware performance data and software performance data. Examples of hardware performance data may comprises a number of read heads in use, the type or types of read heads in use, e.g., with regard to bandwidth, a maximum number of read heads available for use, the type or types of the read heads available for use, a number and/or type(s) of write heads in use, and a maximum number of write heads available for use, including the type or types of the write heads with regard to bandwidth. Example software performance data comprises a number of encoders in use and a number of decoders in use, bandwidth information on the encoders/decoders, as well as client-facing bandwidth and latency information. Further, the current state of policies (e.g., scheduling policies) that affect system performance also may be monitored.

Method 82 further comprises, at 86, monitoring current workload data for the system. The current workload data may comprise, for example, data regarding one or more of storage demand (e.g., an amount of data to be written and/or a bandwidth demand for the data writing) and retrieval demand (e.g., an amount of data to be read and/or a bandwidth demand for data reading).

Method 82 next comprises, at 88, forming a feature vector for input into a machine-learning model configured to reconfigure the system based upon a target performance of the system. The feature vector may include any suitable information, such as the current performance data, the current workload data, and data related to the target system performance (e.g., service-level agreement information for current read/write demands, and/or any other suitable target system performance data). Likewise, any suitable machine-learning model may be used, including reinforcement learning models. Method 82 further comprises, at 90, providing the feature vector to the machine-learning model; at 92, obtaining from the machine-learning model an output of one or more actions to take to adjust a state of the system based upon the target performance of the system; and at 94, implementing the one or more actions to adjust the state of the system. Any suitable action may be implemented. Examples include, but are not limited to, adjusting a hardware configuration (e.g., adjusting the number of read heads in use, adjusting a maximum number of read heads, adjusting a number of write heads in use, and adjusting a maximum number of write heads), and/or adjusting a software configuration (e.g., adjusting a number of encoders in use, a number of decoders in use, and/or the detailed configuration thereof). As noted hereinabove, encoder/decoder function may be enacted at least partially on an elastically provisioned computer system on a computer network.

No aspect of the foregoing drawings or description should be interpreted in limiting sense, for numerous variations, extensions, and omissions are also envisaged. For example, because of the disaggregated nature of the disclosed examples, provisioning of resources may happen at different time scales, including at deployment time and later at runtime in response to historical trends, desired performance targets, and other suitable factors. Even the maximum number of heads (M for Write heads, P for Read heads) may not be fixed over time. The process of deciding if/when/how to change the amount of heads provisioned for the system may happen asynchronously (in parallel) with the standard operation of the system.

Separately, another kind of re-configuration (e.g., as illustrated in step 68 in FIG. 4A), which relates to re-configuring the resources currently deployed in the system (e.g., changing associativity of heads to substrates, or other parameters of the software environment), is utilized by the disclosed examples. Such reconfiguration processes may happen orthogonally and/or concomitantly with the provisioning described above. Both the reconfiguration and reprovisioning aspects of the disclosed examples provide for elasticity and right provisioning of a system, which help to efficiently utilize available resources.

Further, the description of DSR system 10 is intended to be illustrative and non-limiting. For instance, although FIG. 1 shows a combined DSR system with shared components, separate but cooperating data-storage and data-retrieval systems may also be used. Cooperating data-storage and data-retrieval systems may communicate with an external bank of data-storage substrates, for example.

Figure 6:
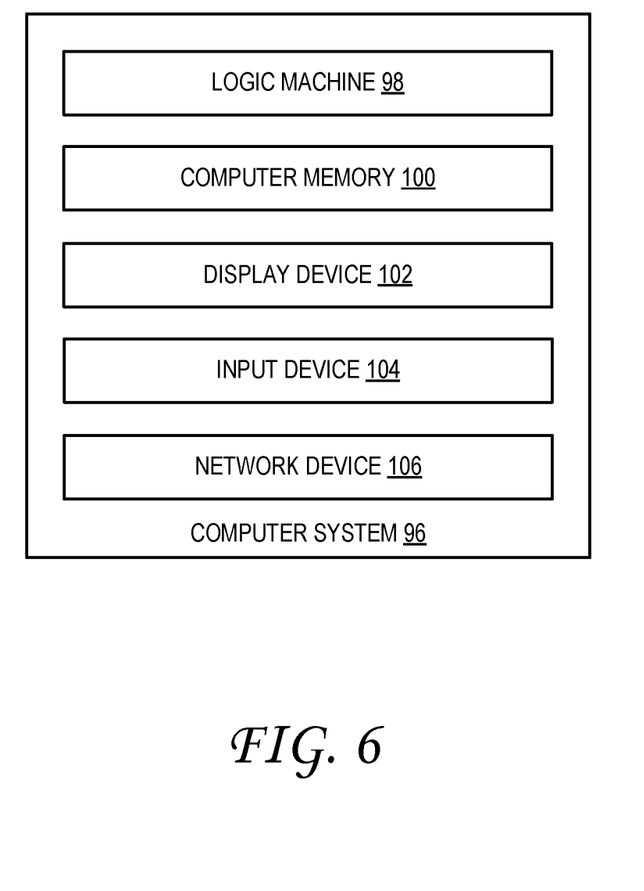
FIG. 6 shows aspects of an example computer system.

FIG. 6 schematically shows a non-limiting embodiment of a computer system 96 that can enact one or more of the methods and processes described above. Computer system 96 is shown in simplified form. Computer system 96 may take the form of one or more server computers, network computing devices, and/or other computing devices. In some examples, computer system 12 may be embodied as write controller 40, read controller, encoder 30, and/or decoder 50.

Computer system 96 includes a logic machine 98 and associated computer memory 100. Computer system 96 may optionally include a display device 102, input device 104, network device 106, and/or other components not shown in FIG. 5.

Logic machine 98 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 98 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Computer memory 100 includes one or more physical devices configured to hold instructions executable by the logic machine to implement the methods and processes described herein. When such methods and processes are implemented, the state of computer memory 100 may be transformed—e.g., to hold different data.

Computer memory 100 may include removable and/or built-in devices. Computer memory 100 may include optical memory (e.g., CD, DVD, HD-DVD, Blu-Ray Disc, etc.), semiconductor memory (e.g., RAM, ROM, EPROM, EEPROM, etc.), and/or magnetic memory (e.g., hard-disk drive, tape drive, MRAM, etc.), among others. Computer memory 100 may include volatile, nonvolatile, dynamic, static, read/write, read-only, random-access, sequential-access, location-addressable, file-addressable, and/or content-addressable devices.

It will be appreciated that computer memory 100 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 98 and computer memory 100 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer system 96 implemented to perform a particular function. In some cases, a module, program, or engine may be instantiated via logic machine 98 executing instructions held by computer memory 100. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, display device 102 may be used to present a visual representation of data held by computer memory 100. This visual representation may take the form of a graphical user interface (GUI). As the herein described methods and processes change the data held by the computer memory, and thus transform the state of the computer memory, the state of display device 130 may likewise be transformed to visually represent changes in the underlying data. Display device 102 may include one or more display components utilizing virtually any type of technology. Such display components may be combined with logic machine 98 and/or computer memory 100 in a shared enclosure, or such display devices may be peripheral display devices.

When included, input device 104 may comprise or interface with one or more user-input components such as a keyboard, mouse, or touch screen. In some embodiments, the input device may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, network device 106 may be configured to communicatively couple computer system 96 with one or more other computing devices. Network device 106 may include wired and/or wireless communication components compatible with one or more different communication protocols. As non-limiting examples, the network device may be configured for communication via a wireless telephone network, or a wired or wireless local- or wide-area network. In some embodiments, the network device may allow computer system 96 to send and/or receive messages to and/or from other devices via a network such as the Internet.

Another example provides a data-storage system comprising a head receiver configured to variably receive up to a number M of write heads; an installed number N of write heads arranged in the head receiver; a substrate receiver configured to receive one or more data-storage substrates; and a positioner machine configured to adjust a relative placement of each of the M write heads with respect to at least one of the one or more data-storage substrates. In some implementations, the positioner machine is configured to move one or more of each of the M write heads and the at least one or more of the data-storage substrates. In some implementations, the write heads comprise optical write heads configured to direct sub-nanosecond laser irradiance on a data-storage substrate associated with the optical write head. In some implementations, the installed number N of write heads includes fewer than the number M of optical read heads. In some implementations, at least one of the installed number N of write heads has a variable data-writing bandwidth. In some implementations, the data-storage system further comprises at least one read head arranged in the head receiver, the read head including a camera configured to image a data-storage substrate associated with the optical read head. In some implementations, each of the installed number N of write heads is configured to write arbitrary digital data encoded as a localized birefringence in the associated data-storage substrate. In some implementations, the data-storage system further comprises at least one femtosecond laser configured to provide the laser irradiance to one or more of the maximum number M of write heads.

Another example provides a data-retrieval system comprising a head receiver configured to receive up to a number P of read heads; an installed number Q of read heads arranged in the head receiver; a substrate receiver configured to receive one or more data-storage substrates; and a positioner machine configured to adjust a relative placement of each of the P read heads with respect to at least one of the one or more data-storage substrates.

In some implementations, the positioner machine is configured to move one or more of the read heads and the at least one of the one or more data-storage substrates. In some implementations, each of the read heads includes a camera configured to image a data-storage substrate associated with the optical read head. In some implementations, the installed number Q of optical read heads includes fewer than the number P of read heads. In some implementations, at least one of the installed number Q of optical read heads has a variable data-reading bandwidth. 0. In some implementations, the data-retrieval system further comprises at least one optical write head arranged in the head receiver, the optical write head configured to direct a subnanosecond laser irradiance on a data-storage substrate associated with the optical write head.

Another example provides a method for reconfiguring a system to store and retrieve data in a data server, the method comprising: monitoring current performance data for the system, the current performance data comprising data regarding one or more of storage performance and retrieval performance; monitoring current workload data for the system, the current workload data comprising data regarding one or more of storage demand and retrieval demand; forming a feature vector for a machine-learning model, the feature vector comprising the current performance data, the current workload data, and data related to a target performance of the system; providing the feature vector to the machine-learning model; obtaining from the machine-learning model an output of one or more actions to take to adjust a current state of the system based upon the target performance of the system; and implementing the one or more actions to adjust the current state of the system.

In some implementations, the current performance data for the system comprises one or more of a number of read heads in use, a number of write head in use, a maximum number of read heads, a maximum number of write heads, a number of encoders in, a number of decoders in use, and a scheduling policy. In some implementations, the machine-learning model comprises a reinforcement learning model. In some implementations, implementing the one or more actions comprises one or more of adjusting a hardware configuration of the system, adjusting a software configuration of the system, and adjusting a policy of the system. In some implementations, adjusting the hardware configuration of the system comprises one or more of adjusting the number of read heads in use, adjusting a maximum number of read heads, adjusting a number of write heads in use, and adjusting a maximum number of write heads. In some implementations, implementing the one or more actions comprises adjusting one or more of an encoder configuration and a decoder configuration enacted in an elastically provisioned computer system on a computer network.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A data-storage system comprising:
   a head receiver configured to variably receive up to a number M of write heads;
   an installed number N of write heads arranged in the head receiver, wherein each of the installed number N of write heads is configured to encode data as a localized birefringence in an associated data-storage substrate or to encode data in holographic data storage;
   a substrate receiver configured to receive one or more data-storage substrates; and
   a positioner machine configured to adjust a relative placement of each of the M write heads with respect to at least one of the one or more data-storage substrates.

2. The data-storage system of claim 1 wherein the positioner machine is configured to move one or more of each of the M write heads and the at least one or more of the data-storage substrates.

3. The data-storage system of claim 1, wherein the write heads comprise optical write heads configured to direct sub-nanosecond laser irradiance on a data-storage substrate associated with the optical write head.

4. The data-storage system of claim 1 wherein the installed number N of write heads includes fewer than the number M of optical write heads.

5. The data-storage system of claim 1 wherein at least one of the installed number N of write heads has a variable data-writing bandwidth.

6. The data-storage system of claim 1 further comprising at least one read head arranged in the head receiver, the read head including a camera configured to image a data-storage substrate associated with the optical read head.

7. The data-storage system of claim 1 wherein each of the installed number N of write heads is configured to write arbitrary digital data encoded as a localized birefringence in the associated data-storage substrate.

8. The data-storage system of claim 1 further comprising at least one femtosecond laser configured to provide the laser irradiance to one or more of the maximum number M of write heads.

9. A data-retrieval system comprising:
   a head receiver configured to receive up to a number P of read heads;
   an installed number Q of read heads arranged in the head receiver, wherein each of the installed number Q of read heads is configured to read data encoded as a localized birefringence in an associated data-storage substrate or to read data encoded in holographic storage;
   a substrate receiver configured to receive one or more data-storage substrates; and
   a positioner machine configured to adjust a relative placement of each of the P read heads with respect to at least one of the one or more data-storage substrates.

10. The data-retrieval system of claim 9 wherein the positioner machine is configured to move one or more of the read heads and the at least one of the one or more data-storage substrates.

11. The data-retrieval system of claim 9, each of the read heads including a camera configured to image a data-storage substrate associated with the optical read head.

12. The data-retrieval system of claim 9 wherein the installed number Q of optical read heads includes fewer than the number P of read heads.

13. The data-retrieval system of claim 9 wherein at least one of the installed number Q of optical read heads has a variable data-reading bandwidth.

14. The data-retrieval system of claim 9 further comprising at least one optical write head arranged in the head receiver, the optical write head configured to direct a subnanosecond laser irradiance on a data-storage substrate associated with the optical write head.

* * * * *